Jan. 10, 1950     P. PELLÉ     2,494,194
TELEGRAPHIC MEASURING TRANSMITTER
Filed March 21, 1946
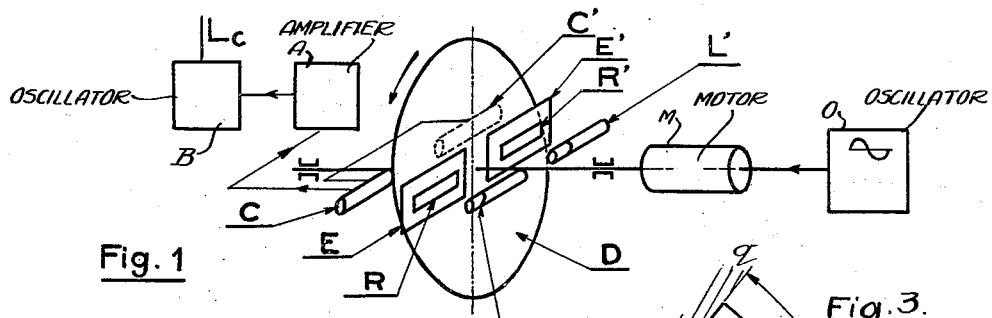
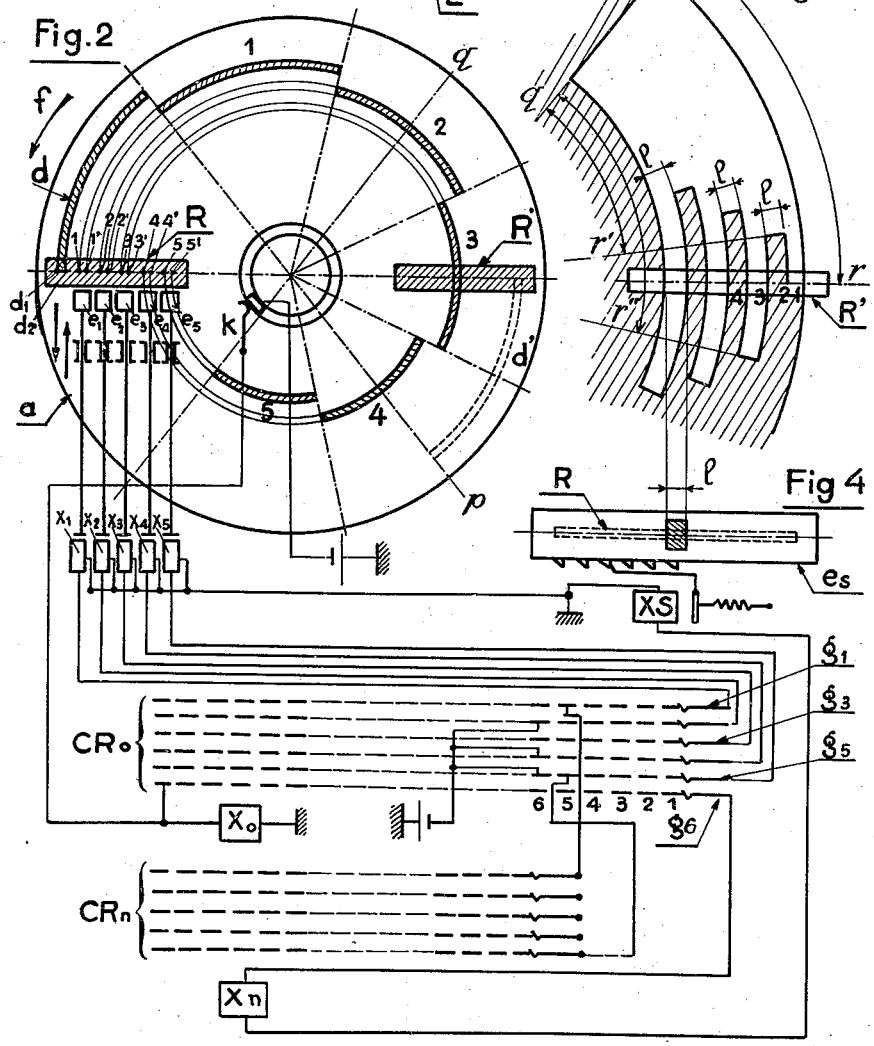
Inventor:
Pierre Pellé
By Singer, Ehlert, Stern
& Carlberg, attorneys Patented Jan. 10, 1950

2,494,194

UNITED STATES PATENT OFFICE 2,494,194

TELEGRAPHIC MEASURING TRANSMITTER

Pierre Pellé, Arcueil, France

Application March 21, 1946, Serial No. 655,969
In France February 14, 1945

Section 1, Public Law 690, August 8, 1946
Patent expires February 14, 1965

6 Claims. (Cl. 178—53.1)

The present invention relates to telegraphic transmitter systems.

The object is to obtain telegraphic transmission necessary for measuring the "margin of reception" of telegraphic apparatus operating in the arhythmic code with seven intervals of the "start-stop" type.

It is known that in such a transmission each character is represented by a group of seven signals which succeed each other as follows:

A starting signal which corresponds always to the same value of the current in the line, Five code signals succeeding the preceding one and the current values of which vary according to the character transmitted, and Another stop signal which always corresponds to the same current value, this value being different from that of the starting signal.

When the transmission is free from distortion, the durations of the elementary signals are all equal to each other and to the theoretical value corresponding to the speed of transmission for which the teleprinter is constructed.

For measuring the margin, the emission is progressively distorted by lengthening and then shortening the starting signal while the stop signal is caused to undergo reverse distortion in such way that the sum of the durations of these two signals remains constant, the five code elements however, retain their theoretical value.

This particular distortion is increased progressively until the teleprinter ceases to translate correctly.

For each rate of distortion, the measuring transmitter must be constructed so that it can also deal with the transmission of all the characters which the teleprinter is capable of translating.

Finally, when the measurements or tests are carried out at a distance, a line is interposed between the measuring transmitter and the teleprinter, and it is advisable to make a repeated emission of signals comprising all the necessary characters, so that the distortion of the emission attains a constant value during the whole period of transmission of each signal and progressing by stages, for example in increments of 5 per cent. from one emission to the following one.

In this case, the transmitter must also transmit at the commencement of each wording, an indication of the extent of distortion to which the wording is subject, so that the teleprinter operator can readily ascertain the extent of distortion at which the apparatus ceases to correctly translate.

Apparatus of the foregoing type are already known but they entail delicate motor driven mechanism, the complexity of which give rise to variations in the flexible couplings which affect the precision of emission. Furthermore, this precision depends upon the adjustment of a plurality of contacts which generally make the functioning of the transmitter precarious and delicate.

The apparatus forming the object of the present invention avoids these disadvantages but at the same time complies with all the necessary conditions for measuring the margin of reception. It ensures the automatic emission of a text which may comprise a considerable number of characters, the emission is repeated automatically, thus ensuring a gradually increasing rate of distortion alternately by lengthening and shortening the starting signal of each combination transmitted, the distortion remaining the same during the whole period of transmission of each text and the amount of this distortion is transmitted to the teleprinter at the head of said text.

The precision of the apparatus is enhanced considerably by the introduction of a time distributor system to which no other function is given. This distributor, the movement of which is perfectly uniform, is operated by an oscillator controlled motor, the frequency of which is constant and accurate, thus ensuring perfect constancy of the duration of emission of each character and of each elementary signal. Furthermore, this distributor does not have any contact capable of affecting the line transmission. Finally, a modulator device consisting only of simple and strong parts permits the emission of a text comprising any number of characters.

The accompanying drawing illustrates one embodiment of the invention and it is to be understood that the invention is not restricted to the particular method described in connection therewith.

In the drawing:

Fig. 1 illustrates the transmitter diagrammatically.

Fig. 2 is a diagrammatic illustration of the distributor, and shows particularly the rotating disc and the modulator.

Fig. 3 is a detail view of one of the slots of the distributor disc, and

Fig. 4 illustrates in connection with Fig. 2 the arrangement of a screen in front of which the slot is displaced.

According to the invention use is made of a disc making one revolution for each combination corresponding to a character of the text to be transmitted.

This disc D, (Figure 1) functions as an obstructor of light and is placed between a luminous source L and a photo-electric cell C. The luminous source L illuminates a slot R extending radially of the disc D and formed in a screen E placed in front of the disc D.

The currents from the photo-electric cell C after passing into an amplifier A, actuate an oscillator indicated diagrammatically by B (Figure 1) which can assume two well defined conditions according to whether the cell is illuminated or not, and thus transmit on to the line Lc, two current values, each corresponding to one of these conditions. This oscillator ensures the transmission of modulated currents to the teleprinter, each of its conditions corresponding to the emission of a wall defined current value.

The sectional division of the obstructing disc D is shown in Figure 2. It is divided into seven equal sector-like portions, each of which corresponds to an element of the combination. In each sector an arcuate slot is cut, the radius of each slot being less than the preceding one.

The slot $d$ corresponds to the signal "start" and the slots 1 to 5 to the code elements. The portion of the disc designated $a$ viz: the seventh section, does not have any radial slots because the stop signal to which it corresponds must cause the emission on to the line of the current value which is not utilised for the start element.

When the disc D rotates in the direction of the arrow $f$, i. e. anti-clockwise, the slot $d$ uncovers the portion $d1$, $d2$ of the horizontal slot R of the screen E, this is followed by slot 1 which uncovers the portion 1, 1' of the screen E, etc. When the slot 5 has moved past the slot R the photo-electric cell is no longer illuminated during the whole period of passage of the section $a$. When the cell is illuminated it causes the oscillator B of Figure 1 to transmit the current value corresponding to the start signal. When it is not illuminated, said oscillator is caused to transmit the current value corresponding to the stop signal.

In order to obtain emission of any combination a series of five screens $e1$, $e2$, $e3$, $e4$, $e5$ is interposed between the screen E and the disc D, said screens being individually controlled by five electromagnets $X1$, $X2$, $X3$, $X4$, $X5$, each screen being arranged to uncover or cover a portion of the radial slot R of same range by vertical movement, as shown in Figure 2, according to whether or not its electromagnet is energized.

If it be assumed for example that the electromagnets $x2$, $x4$ and $x5$ are supplied in such manner that their corresponding screens are open, the passage of the slots 1 and 3 (Figure 2) opposite the slot R will not illuminate the cell C and during this period the oscillator B will be placed in the position corresponding to the emission of the current value corresponding to the stop signal, whilst the current value corresponding to the start signal will be obtained during the passage of the slots $d$, 2, 4 and 5.

If now it is desired to emit a text or wording, it is sufficient to activate the electromagnets $x1$, $x2$ ... $x5$ by means of a rotary commutator CRo, of the step-by-step type used in automatic telephony, wherein the control wires of these electromagnets are connected to five contact brushes and wiring each of its segments over the banks of contacts in such way as to obtain the desired connection with the electromagnets.

The lower portion of Fig. 2 illustrates this arrangement in which the bank of contacts is shown in developed condition and the brushes $g1$ to $g6$ are shown opposite the row of contacts which they operate. If, for example, it is desired to energize the electromagnets 2, 4 and 5 on the segment 6 it is sufficient to connect the battery to the corresponding contacts.

The electromagnet $x0$ (Fig. 2), which controls the step-by-step advance of this commutator, is energized by a sliding contact K located on the disc D of Figure 2 in such way that the rotary commutator advance during the period of the passage of the sector and aperture $a$ and $d$ respectively of said disc in front of the slot R. Actually, during this time the current values to be transmitted are always the same and independent of the combination to be transmitted in the following revolution. Thus the successive emission is obtained of the various characters of a text determined in advance by the wiring of the rotary commutator CRo.

It is seen that if the torque between the disc and its driving motor is constant, no jerk is capable of varying its speed. Consequently, if the motor M (Figure 1) is controlled by an oscillator O of constant frequency, the durations of the elementary signals, defined by the time of passage of each slot of the disc past the slot R will all be of known value. The emission is consequently very precise and independent of the transmitted modulation, it furthermore does not depend upon any electric contact element.

A change in the emission, with a view to effecting the particular distortion required, is obtained as follows:

A second group consisting of luminous source L', screen E', cell C' and identical with the group L, E, C is added to the apparatus shown in Figure 1 but which is diametrically opposed thereto in front of the disc D in such way that a slot R', similar to the slot R and in radial alignment therewith, equally illuminates the latter. Furthermore, the slot $d$ of the disc D (Figure 2) is made to rotate 180° which brings it to $d'$.

The length of the slot R is reduced at the part from 1 to 5' of Figure 2 and the length of the slot R' is such that it only illuminates the aperture $d'$.

If now the cell C is connected in parallel with the cell C' for actuating the oscillator B, the original operating conditions are re-established.

In order to obtain a lengthening or a shortening of the start signal, it is sufficient to make the slot $d'$ longer or shorter than the length given to it in Figure 2 by way of example.

For this purpose the slot $d'$ is cut out in the shape shown in Figure 3 and between the screen E' and the disc D is placed a supplementary screen $es$ (Figure 4) which shuts off the whole of the slot R' with the exception of a width equal to the distance $l$. This screen $es$ is capable of moving horizontally step-by-step due to the action of an electromagnet $xs$ which operates it by a pawl and rack device according to the arrangements of Figure 4.

At each stop, the said screen is shifted a distance $l$. It thus uncovers the element 1, 2 of the slot R', Figure 2. The effect being the same as if the slot $d'$ were of a length equal to the arc $rq$ and the start element had its theoretical duration.

If the screen $es$ uncovers the part 2, 3 of the slot R', everything takes place as if the slot $d'$ were of a length equal to the arc $r'q$, the start signal being thus shortened. When the screen es uncovers the part 3, 4 of the slot R' the start signal is on the contrary, lengthened. Thus by the simple displacement of the screen es, lengthenings and shortenings of the start signal can be obtained in gradually increasing and known quantities.

This displacement may be obtained automatically at each text termination by using the commutator contact $k$ to supply the electromagnet $xs$ through a contact arranged on a line of contacts and a special contact brush $gs$ of the rotary step-by-step commutator CRo utilised for obtaining the text.

The emission of the symbol controlling the rate of distortion for each text is obtained by reserving one row of the rotary commutator CRo and connecting the five plugs of this row to the contact brushes of a second commutator CRn which in turn provides the necessary connections with each of its positions for the electromagnets $x1 \ldots x5$. The progression electromagnet $xn$ of this rotary commutator is actuated after each text with each revolution of CRo, for example at the same time as $xs$ as shown by Figure 2. It is here supposed that the characteristic number of the distortion only comprises one symbol, but the process is obviously applicable to any number of symbols.

Obviously, in electric circuit, not shown on the drawing enables the rotary step-by-step commutators CRo and CRn to be stopped after having been brought into the position of rest when the screen es has explored all the slots d' corresponding to the different degrees of distortion necessary for the measuring. Simultaneously, the screen es is brought back into the position of rest. In this position, the disc D rotates and transmits in an un-interrupted manner the character corresponding to the wiring of the first segment of the rotary commutator CRo.

The same electric circuit is employed for starting a fresh testing cycle by a hand operated switch.

I claim:

1. Electric transmitter for teleprinters having a light scanning assembly comprising in the scanning assembly a disc, means for rotating the disc at uniform speed, the disc being provided with six arcuate apertures, each located in one of seven sectors of uniform size, which completely cover the area of the disc, each of the arcuate apertures being curved on a radius different from that of the other apertures, a screen in opposition to a face of the disc, the screen being provided with an elongated slot in a position to be intersected successively by the arcuate apertures during the rotation of the disc, a source of light adapted to emit a beam through said slot, a photoelectric cell in the path of said beam of light, an amplifier in the circuit of the photoelectric cell, a rocking device associated with the amplifier, a plurality of electromagnets, an equal plurality of obturators for portions of the slot of the screen intersected successively by said apertures and under control of said electromagnets to free or obstruct respectively the portions of the slot, means for selectively energizing the electromagnets, whereby, depending upon the selection of the electromagnets in each revolution of the disc signals of different character are produced by the photoelectric cell in the rocking device, a second screen facing the scanning disc and provided with a slot in diametrical alinement with the slot of the first mentioned screen, and means for varying the location and the interval at which the second slot becomes effective for the passage of light therethrough, a second source of light in front of said second screen, and a second photoelectric cell in the path of the light passing through the second slot, the two photoelectric cells being connected in parallel.

2. Electric transmitter for teleprinters having a light scanning assembly comprising in the scanning assembly a disc, means for rotating the disc at uniform speed, the disc being provided with six arcuate apertures, each located in one of seven sectors of uniform size, which completely cover the area of the disc, each of the arcuate apertures being curved on a radius different from that of the other apertures, a screen in opposition to a face of the disc, the screen being provided with an elongated slot in a position to be intersected successively by the arcuate apertures during the rotation of the disc, a source of light adapted to emit a beam through said slot, a photoelectric cell in the path of said beam of light, an amplifier in the circuit of the photoelectric cell, a rocking device associated with the amplifier, a plurality of electromagnets, an equal plurality of obturators for portions of the slot of the screen intersected successively by said apertures and under control of said electromagnets to free or obstruct respectively the portions of the slot, means for selectively energizing the electromagnets, whereby, depending upon the selection of the electromagnets in each revolution of the disc signals of different character are produced by the photoelectric cell in the rocking device, a second screen facing the scanning disc and provided with a slot in diametrical alinement with the slot of the first mentioned screen, a second source of light in front of said screen, and a second photoelectric cell in the path of the light passing through said second slot, the two photoelectric cells being connected in parallel, one of the arcuate apertures of the scanning disc having portions of different arcuate length which are differentially disposed radially of the disc, and means for preventing passage of light through any but a selectively determined portion of said last named arcuate aperture, whereby the location of the portion of the second slot which becomes effective for the passage of the light therethrough and the length of the interval for this passage of the light through said portion may be varied.

3. Electric transmitter for teleprinters having a light scanning assembly comprising in the scanning assembly a disc, means for rotating the disc at uniform speed, the disc being provided with six arcuate apertures, each located in one of seven sectors of uniform size, which completely cover the area of the disc, each of the arcuate apertures being curved on a radius different from that of the other apertures, a screen in opposition to a face of the disc, the screen being provided with an elongated slot in a position to be intersected successively by the arcuate apertures during the rotation of the disc, a source of light adapted to emit a beam through said slot, a photoelectric cell in the path of said beam of light, an amplifier in the circuit of the photoelectric cell, a rocking device associated with the amplifier, a plurality of electromagnets, an equal plurality of obturators for portions of the slot of the screen intersected successively by said apertures and under control of said electromagnets to free or obstruct respectively the portions of the slot, means for selectively energizing the electromagnets, whereby, depending upon the selection of the electromagnets in each revolution of the disc, signals of different character are produced by the photoelectric cell in the rocking device, a second screen facing the disc and provided with a slot in diametrical alinement with the slot of the first mentioned screen, a second source of light in front of said second slot, and a second photoelectric cell in the path of the light passing through said second slot, the two photoelectric cells being connected in parallel, one of the arcuate apertures of the screen being provided with arcuate tongues projecting from a stepped end of said aperture into the area of said aperture and extending from said stepped end at different radial distances, the tongues being radially spaced equal distances from each other, and a supplementary screen radially displaceable relatively to the disc and parallel to the slot in the second screen, the supplementary screen having an opening of a width equal to the uniform spacing between said tongues, whereby, dependent upon the location of the supplementary screen relatively to the second slot, the light from the source of light passing through said aperture will energize the second photoelectric cell for selectively determined periods during rotation of the disc at uniform speed.

4. Electric transmitter for teleprinters having a light scanning assembly comprising in the scanning assembly a disc, means for rotating the disc at uniform speed, the disc being provided with six arcuate apertures, each located in one of seven sectors of uniform size, which completely cover the area of the disc, each of the arcuate apertures being curved on a radius different from that of the other apertures, a screen in opposition to a face of the disc, the screen being provided with an elongated slot in a position to be intersected successively by the arcuate apertures during the rotation of the disc, a source of light adapted to emit a beam through said slot, a photoelectric cell in the path of said beam of light, an amplifier in the circuit of the photoelectric cell, a rocking device associated with the amplifier, a plurality of electromagnets, an equal plurality of obturators for portions of the slot of the screen intersected successively by said apertures and under control of said electromagnets to free or obstruct respectively the portions of the slot, means for selectively energizing the electromagnets, whereby, depending upon the selection of the electromagnets in each revolution of the disc signals of different character are produced by the photoelectric cell in the rocking device, a second screen facing the scanning disc and provided with a slot in diametrical alinement with the slot of the first mentioned screen, a second source of light in front of said second slot, a second photoelectric cell in the path of the light passing through the second slot, the two photoelectric cells being connected in parallel, one of the arcuate apertures of the scanning disc being provided with arcuate tongues extending each from a stepped end of the aperture, the different steps of the aperture being at different radial distances from the center of the scanning disc, and the tongues extending from the stepped ends being radially spaced equal distances from each other, a supplementary screen radially displaceable relatively to the disc and parallel to the second slot, the supplementary screen having an opening of a width equal to the uniform spacing between said tongues, an electromagnetically operated mechanism controlled by the scanning disc for intermittently displacing the supplementary screen one step at a predetermined point of time in each revolution of the scanning disc, whereby, dependent upon the location of the supplementary screen relatively to the second screen, the light from the source of light passing through the said stepped aperture will energize the second photoelectric cell for selectively determined periods during rotation of the scanning disc at uniform speed.

5. Electric transmitter for teleprinters having a light scanning assembly comprising in the scanning assembly a disc, means for rotating the disc at uniform speed, the disc being provided with six arcuate apertures, each located in one of seven sectors of uniform size, which completely cover the area of the disc, each of the arcuate apertures being curved on a radius different from that of the other apertures, a screen in opposition to a face of the disc, the screen being provided with an elongated slot in a position to be intersected successively by the arcuate apertures during the rotation of the disc, a source of light adapted to emit a beam through said slot, a photoelectric cell in the path of said beam of light, an amplifier in the circuit of the photoelectric cell, a rocking device associated with the amplifier, a plurality of electromagnets, an equal plurality of obturators for portions of the slot of the screen intersected successively by said apertures and under control of said electromagnets to free or obstruct respectively the portions of the slot, means for selectively energizing the electromagnets, whereby, depending upon the selection of the electromagnets in each revolution of the disc signals of different character are produced by the photoelectric cell in the rocking device, a second screen facing the scanning disc and provided with a slot in diametrical alinement with the slot of the first mentioned screen, a second source of light in front of said second screen, and a second photoelectric cell in the path of the light passing through the second slot, the two photoelectric cells being connected in parallel, one of the arcuate apertures of the scanning disc having portions of different arcuate length which are differentially disposed radially of the disc, a supplementary screen radially displaceable relatively to the scanning disc, parallel to the slot in the second screen, and electromagnetically operated mechanism controlled by the scanning disc for intermittently displacing the supplementary screen distances equal to the radial difference of the portions of different arcuate length in said aperture, said electromagnetically operated mechanism including a ratchet mechanism on the supplementary screen and an electromagnet controlling said ratchet mechanism and connected with the electromagnets for the obturators of the slot in the first mentioned screen.

6. Electric transmitter for teleprinters having a light scanning assembly comprising in the scanning assembly a disc, means for rotating the disc at uniform speed, the disc being provided with six arcuate apertures, each located in one of seven sectors of uniform size, which completely cover the area of the disc, each of the arcuate apertures being curved on a radius different from that of the other apertures, a screen in opposition to a face of the disc, the screen being provided with an elongated slot in a position to be intersected successively by the arcuate apertures during the rotation of the disc, a source of light adapted to emit a beam through said slot, a photoelectric cell in the path of said beam of light, an amplifier in the circuit of the photoelectric cell, a rocking device associated with the amplifier, a plurality of electromagnets, an equal plurality of obturators for portions of the slot of the screen intersected successively by said apertures and under control of said electromagnets to free or obstruct respectively the portions of the slot, means for selectively energizing the electromagnets, whereby, depending upon the selection of the electromagnets in each revolution of the disc signals of different character are produced by the photoelectric cell in the rocking device, a second screen facing the scanning disc and provided with a slot in diametrical alinement with the slot of the first mentioned screen, a second source of light in front of said second screen, a second photoelectric cell in the path of the light passing through said second slot, the two photoelectric cells being connected in parallel, one of the arcuate apertures of the scanning disc being provided with arcuate tongue projecting from a stepped end of the aperture into the area of the aperture and extending from said stepped end at different radial distances relatively to the disc, the tongues being radially spaced equal distances from each other, a supplementary screen displaceable radially relatively to the disc and parallel to the slot in the second screen, the supplementary screen having an opening of a width equal to the uniform spacing between said tongues, and electromagnetically operated mechanism controlled by the scanning disc for intermittently displacing the supplementary screen at a predetermined point of time, with each revolution of the scanning disc, the means for selectively energizing the electromagnets for the obturators of the first mentioned screen comprising a rotatable commutator, a plurality of sets of contact elements arranged on the commutator, conductors leading from the sets of contact elements to the electromagnets respectively, and a source of current with which groups of contacts in each set are connected, the electromagnetically operated mechanism for intermittently displacing the supplementary screen comprising a second rotary commutator associated with said supplementary screen, the second rotary commutator having sets of contact elements, brushes successively engaging the contact elements in the sets of the second rotary commutator and connected with a set of contact elements of the first rotary commutator, an electromagnet effecting intermittent movement of said second rotary commutator, and said last named electromagnet being connected with an electromagnet effecting intermittent advance of the supplementary screen and being also connected with the first named rotary commutator and with the electromagnets controlling the movements of the obturators for the first mentioned screen of the scanning disc.

PIERRE PELLÉ.

REFERENCES CITED

The following references are of record in the file of this patent:

UNITED STATES PATENTS

| Number | Name | Date |
| --- | --- | --- |
| 1,684,117 | Smith | Sept. 11, 1928 |
| 1,805,390 | Clark | May 12, 1931 |
| 2,177,077 | Potts | Oct. 24, 1939 |
| 2,397,202 | Potts | Mar. 26, 1946 |